United States Patent
Howard et al.

(10) Patent No.: US 10,666,600 B2
(45) Date of Patent: *May 26, 2020

(54) INTEGRATED CONTACT CARD COMMUNICATION

(71) Applicant: Microsoft Technology Licensing, LLC, Redmond, WA (US)

(72) Inventors: Gregory Alan Howard, Bellevue, WA (US); Joseph Spencer King, Seattle, WA (US); Yili Aiwazian, San Jose, CA (US); Ian Hunter Todd, Seattle, WA (US); Naud Frijlink, Seattle, WA (US); Shawna Julie Davis, Seattle, WA (US); Christer Garbis, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 680 days.

This patent is subject to a terminal disclaimer.

(21) Appl. No.: 15/183,704

(22) Filed: Jun. 15, 2016

(65) Prior Publication Data

US 2016/0294766 A1   Oct. 6, 2016

Related U.S. Application Data

(63) Continuation of application No. 13/082,413, filed on Apr. 8, 2011, now Pat. No. 9,407,753.

(51) Int. Cl.
*G06F 3/048* (2013.01)
*H04L 12/58* (2006.01)
(Continued)

(52) U.S. Cl.
CPC ............ *H04L 51/36* (2013.01); *G06F 3/0482* (2013.01); *G06F 3/0484* (2013.01); *H04L 51/04* (2013.01);
(Continued)

(58) Field of Classification Search
CPC ..... G06F 3/0482; G06F 3/0484; H04L 51/04; H04L 51/16; H04L 51/22; H04L 51/32;
(Continued)

(56) References Cited

U.S. PATENT DOCUMENTS 7,565,421 B2   7/2009   Naruse
7,664,485 B2   2/2010   Twerdahl et al.
(Continued)

FOREIGN PATENT DOCUMENTS

JP   2009273026 A   11/2009
KR   1020070111118 A   11/2007
KR   1020100137835 A   12/2010

OTHER PUBLICATIONS

"Office Action Issued in Korean Patent Application No. 10-2013-7026585", dated May 21, 2018, 6 Pages.
(Continued)

*Primary Examiner* — Thanh T Vu

(57) ABSTRACT

Embodiments provide integrated reply functionality within the context of a contact card or panel. Contact information is provided for display in the contact card (e.g., a portion of a user interface of a computing device). The contact information is associated with a contact. The contact information identifies one or more transport modes for communication with the contact. In some embodiments, the computing device receives a request from a user to communicate with the contact via at least one selected transport mode. Based on the received request, the computing device provides an input field within the contact card. In other embodiments, the transport mode is automatically selected and the input field is displayed. Data from the user is received into the input field for communication to the contact. The computing device sends the data received into the input field to the contact via the selected transport mode. The integrated reply
(Continued)

functionality is accessible from a conversation history displayed in the contact card.

20 Claims, 8 Drawing Sheets

(51) Int. Cl.
  *H04M 1/725* (2006.01)
  *G06F 3/0482* (2013.01)
  *G06F 3/0484* (2013.01)
  *H04M 1/27453* (2020.01)

(52) U.S. Cl.
  CPC .............. *H04L 51/16* (2013.01); *H04L 51/22* (2013.01); *H04L 51/32* (2013.01); *H04M 1/72552* (2013.01); *H04M 1/27453* (2020.01); *H04M 2250/60* (2013.01)

(58) Field of Classification Search
  CPC ............ H04L 51/36; H04M 1/274508; H04M 1/72552; H04M 2250/60
  See application file for complete search history.

(56) References Cited

U.S. PATENT DOCUMENTS

| | | | |
|---|---|---|---|
| 8,412,845 B2* | 4/2013 | Katis | H04L 12/1827 370/468 |
| 2004/0119761 A1 | 6/2004 | Grossman et al. | |
| 2005/0021767 A1 | 1/2005 | Cai | |
| 2005/0243979 A1 | 11/2005 | Starbuck et al. | |
| 2005/0251555 A1* | 11/2005 | Little, II | H04L 51/043 709/206 |
| 2006/0035632 A1 | 2/2006 | Sorvari et al. | |
| 2009/0244000 A1 | 10/2009 | Thompson et al. | |
| 2009/0327422 A1 | 12/2009 | Katis et al. | |
| 2011/0029923 A1 | 2/2011 | Xu et al. | |
| 2012/0047442 A1* | 2/2012 | Nicolaou | G06F 17/30873 715/738 |

OTHER PUBLICATIONS

"Office Action Issued in European Patent Application No. 12767728.4", dated Apr. 30, 2018, 4 Pages.
"Final office Action Issued in U.S. Appl. No. 13/082,413", dated Oct. 14, 2015, 12 Pages.
"Non Final office Action Issued in U.S. Appl. No. 13/082,413", dated May 15, 2015, 9 Pages.
"Notice of Allowance Issued in U.S. Appl. No. 13/082,413", dated Mar. 29, 2016, 7 Pages.
"Second Office Action Issued in Chinese Patent Application No. 201280016715.5", dated Aug. 3, 2016, 8 Pages.
"Office Action Issued in Japanese Patent Application No. 2014-503915", dated Apr. 5, 2016, 2 Pages.
"First Office Action Issued in European Patent Application No. 12767728.4", dated Jun. 18, 2015, 7 Pages.
"First Office Action and Search Report Issued in Chinese Patent Application No. 201280016715.5", dated Dec. 11, 2015, 15 Pages.
Zabin, Jeff., "Channel Integration: Multiple Languages, Seamless Conversation", Retrieved at http:// chiefmarketer.com/technology/multiple-languages-seamless-03122007/, Mar. 12, 2007, pp. 3.
Brownlow, Mark., "Actually, Facebook changes everything (and nothing)", Retrieved at http://www.email-marketing-reports.com/iland/2010/11/actually-facebook-changes-everything-and-nothing.html, Nov. 16, 2010, pp. 7.
"Chordiant Service-Oriented Architecture", Retrieved at http://www.chordiant.de/architecture/service-oriented-architecture.aspx, Retrieved Date: Dec. 22, 2010, pp. 2.
Gaudin, Sharon., "Update: Facebook Unveils New Messaging System," Retrieved at http://www.computerworld.com/s/article/print/9196581/Update_Facebook_unveils_new_messaging_system, ComputerWorld, Nov. 15, 2010, pp. 2.
"Google Wave," Retrieved at http://wave.google.com/about.html, Retrieved Date: Feb. 2, 2011, Google, pp. 2.
"International Search Report", dated Oct. 31, 2012, Application No. PCT/US2012/032020, Filed Date: Apr. 3, 2012, pp. 9.
"Office Action Issued in Korean Patent Application No. 10-2013-7026585", dated Oct. 23, 2017, 10 Pages.

* cited by examiner

US 10,666,600 B2

INTEGRATED CONTACT CARD COMMUNICATION

CROSS REFERENCE TO RELATED APPLICATIONS

This application is a continuation of and claims priority to U.S. application Ser. No. 13/082,413, entitled "INTEGRATED CONTACT CARD COMMUNICATION," filed Apr. 8, 2011, which is incorporated herein in its entirety.

BACKGROUND

Existing mobile computing devices allow users to communicate with contacts via several modes of communication including voice calls, text messaging, instant messaging, electronic mail, and the like. The different applications responsible for managing the different communication modes maintain histories of the communication between the users and the contacts including the date, time, and participants in each communication. Some existing systems display the histories from different applications in a single user interface for the users. Such existing systems, however, are generally limited to displaying the histories without providing additional functionality for subsequent interaction with the contacts within the same user interface.

SUMMARY

Embodiments of the disclosure provide contact-centric integrated communication within a contact card of a user interface. Contact information is provided for display in a portion of a user interface of a computing device. The contact information is associated with a contact. The contact information includes one or more transport modes. Based on the provided contact information, an input field is provided for display within the portion of the user interface. Data from a user for communication to the contact is received into the input field. The data received into the input field is sent by the computing device to the contact via said at least one of the transport modes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
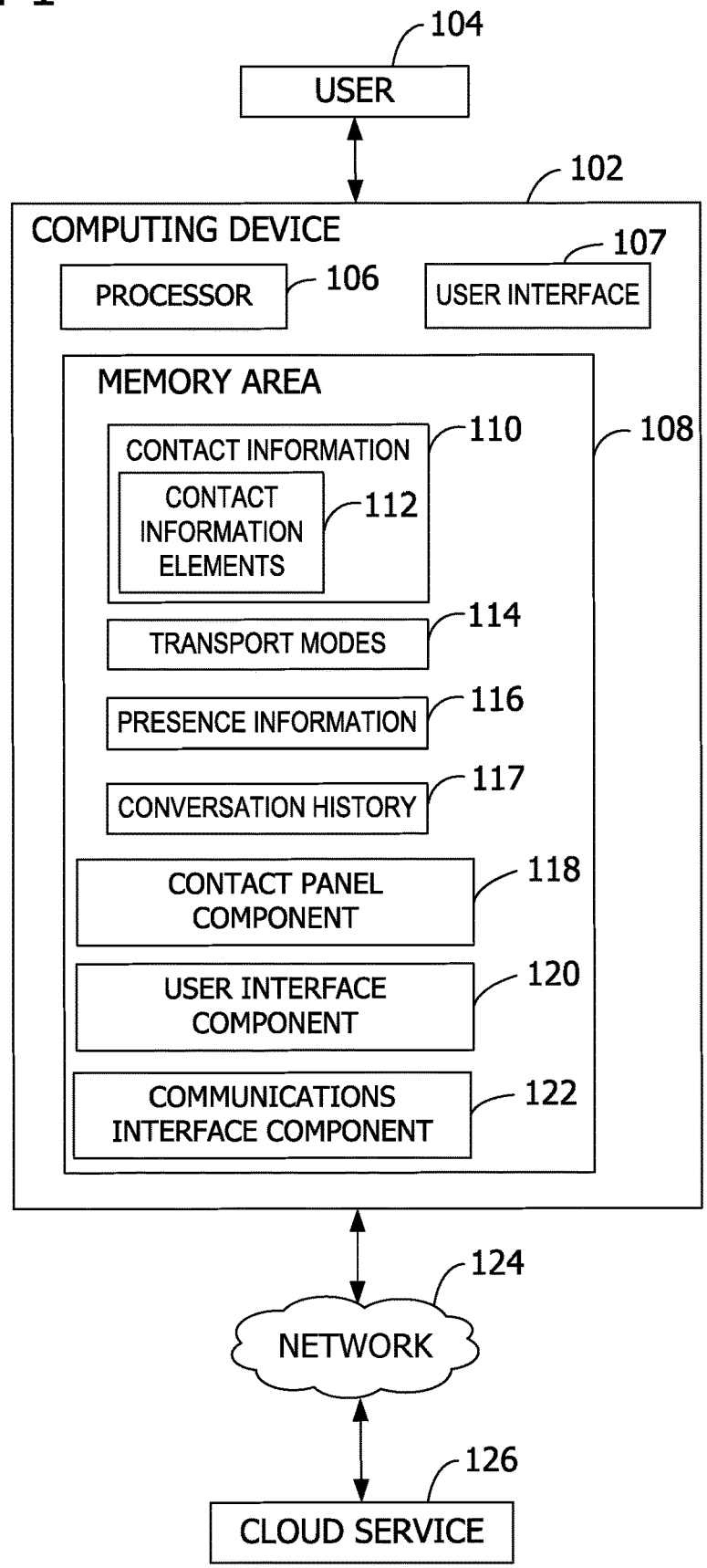
FIG. 1 is an exemplary block diagram illustrating a computing device storing contact information and computer-executable components for providing an input field within a contact panel.

Referring to the figures, embodiments of the disclosure enable a user 104 to initiate communication with a contact from within a contact card or panel of a user interface 107. In some embodiments, the communication is initiated via a conversation history 117 displayed within the contact panel 304. The conversation history 117 spans a plurality of communication or transport modes 114 or channels and represents a unified, aggregated set of communication items corresponding to a running conversation between the user 104 and one or more of the contacts. An input panel displayed with the conversation history 117 enables the user 104 to communicate with contacts from within the context of the contact panel 304.

Aspects of the disclosure further allow the user 104 to directly interact with any communication item in the conversation history 117. For example, the user 104 may return a telephone call to a contact, listen to a voicemail from the contact, reply to an electronic mail message from the contact, send a text message to the contact, share a photo with the contact, send a current location of the user 104 to the contact, and the like, without leaving the context of the contact panel 304 displaying the conversation history 117 with the contact.

Referring next to FIG. 1, an exemplary block diagram illustrates a computing device 102 storing contact information 110 and computer-executable components for providing an input field 306 within the contact panel 304. In the example of FIG. 1, the computing device 102 represents a system for integrated messaging within the contact panel 304 of the user interface 107 of the computing device 102. One or more users such as user 104 interact with the computing device 102. The computing device 102 represents any device executing instructions (e.g., as application programs, operating system functionality, or both) to implement the operations and functionality associated with the computing device 102. The computing device 102 may include a mobile computing device or any other portable device. In some embodiments, the mobile computing device includes a mobile telephone, laptop, netbook, gaming device, and/or portable media player. The computing device 102 may also include less portable devices such as desktop personal computers, kiosks, and tabletop devices. Additionally, the computing device 102 may represent a group of processing units or other computing devices.

The computing device 102 has at least one processor 106, a memory area 108, and at least one user interface 107. The processor 106 includes any quantity of processing units, and is programmed to execute computer-executable instructions for implementing aspects of the disclosure. The instructions may be performed by the processor 106 or by multiple processors executing within the computing device 102, or performed by a processor external to the computing device 102. In some embodiments, the processor 106 is programmed to execute instructions such as those illustrated in the figures (e.g., FIG. 2).

The computing device 102 further has one or more computer-readable media such as the memory area 108. The memory area 108 includes any quantity of media associated with or accessible by the computing device 102. The memory area 108 may be internal to the computing device 102 (as shown in FIG. 1), external to the computing device 102 (not shown), or both (not shown).

The memory area 108 stores, among other data, one or more applications (not shown). The applications, when executed by the processor 106, operate to perform functionality on the computing device 102. Exemplary applications include address book application programs, mail application programs, web browsers, calendar application programs, messaging programs, media applications, location-based services, search programs, and the like. The applications may communicate with counterpart applications or services such as web services accessible via a network such as network 124. For example, the applications may represent downloaded client-side applications that correspond to server-side services executing in a cloud.

The memory area 108 further stores contact information 110 for one or more contacts. For each contact, the contact information 110 includes one or more contact information elements 112 such as name, title, company, telephone number, electronic mail address, postal mail address, etc. In some embodiments, the contact information 110 is obtained from a remote data storage area such as provided by a cloud service 126. The obtained contact information 110 is cached in the memory area 108, and updates provided by the user 104 to the computing device 102 are sent back to the cloud service 126. In such embodiments, the computing device 102 communicates with the cloud service 126 via the network 124.

The memory area 108 further identifies the transport modes 114 for communication with the contact. Exemplary transport modes 114 include text messaging (e.g., such as the short message service), instant messaging (IM), electronic mail, voice calls (e.g., incoming calls, outgoing calls, missed calls, and voicemail), video chats, social networking website accounts, and the like. The voice mails may be traditional, telephone line calls and/or voice over Internet Protocol (VoIP) calls.

The memory area 108 further stores presence information 116 for each contact. Presence information 116 describes a status or activity of the contact (e.g., away, offline, online, busy, in a call, in a chat, in a meeting, "do not disturb", etc.). The memory area 108 further stores the conversation history 117. The conversation history 117 describes prior communication between the user 104 and one or more of the contacts. In some embodiments, the conversation history 117 includes a set of previous communications including one or more of the following: text messages, voice call information, electronic mail messages, and/or entries from social networking websites. The social networking website entries may include public postings or private postings directed to the user 104 or a subset of users.

The transport modes 114, presence information 116, and conversation history 117 may be stored separate from the contact information 110 (shown) or as part of the contact information (not shown). In further embodiments, the contact information elements 112 include or identify the presence information 116, conversation history 117, and one or more of the transport modes 114.

The memory area 108 further stores one or more computer-executable components. Exemplary components include a contact panel component 118, a user interface component 120, and a communications interface component 122. The operation of these components is described below with reference to FIG. 2.

Figure 2:
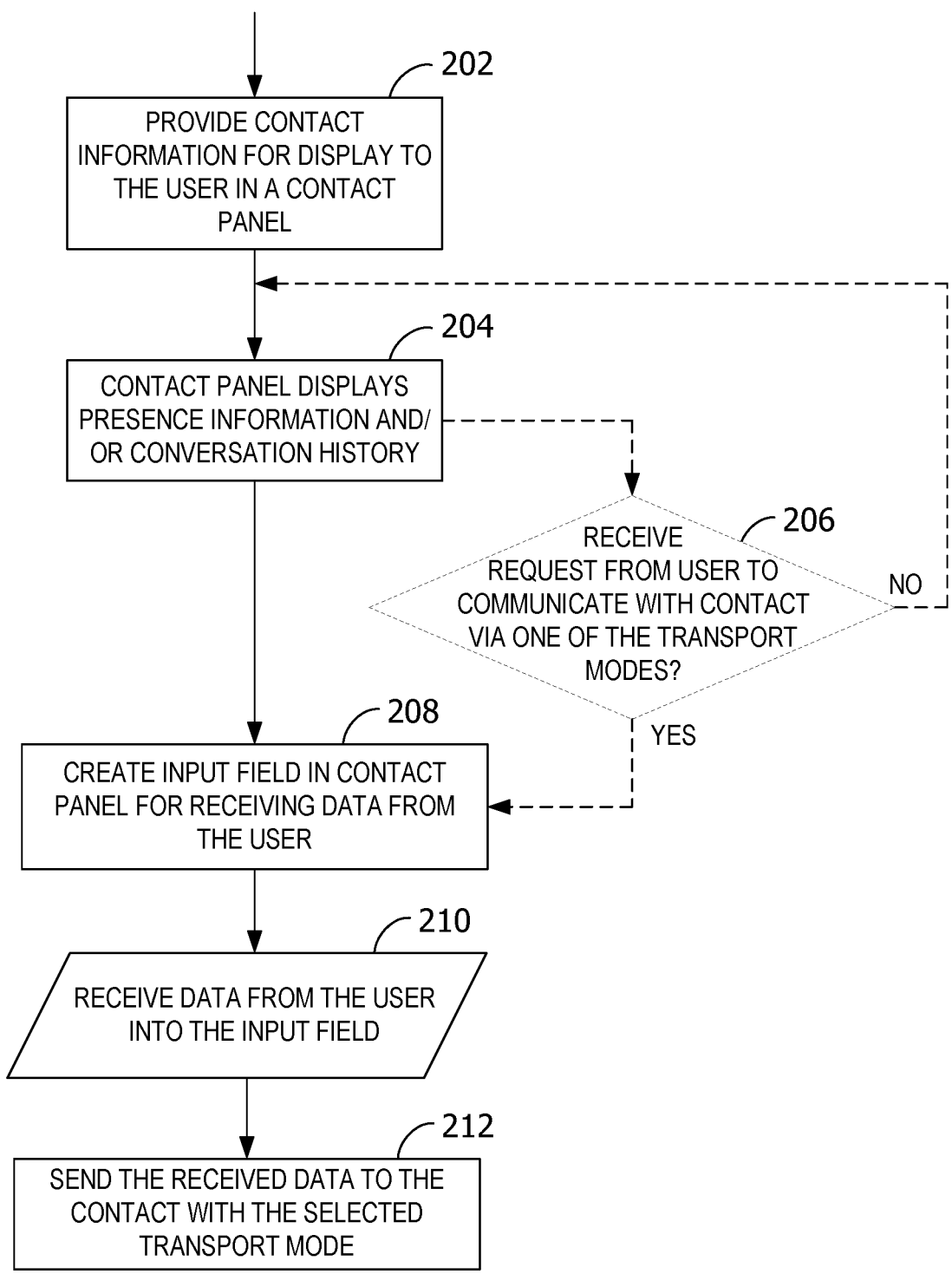
FIG. 2 is an exemplary flow chart illustrating operation of the computing device to enable communication between a user and a contact via an input field in a contact panel.

Referring next to FIG. 2, an exemplary flow chart illustrates operation of the computing device 102 to enable communication between the user 104 and a contact via the input field 306 in the contact panel 304. At 202, contact information 110 is provided for display in the contact panel 304. For example, the cloud service 126 may provide the contact information 110 for display to the user 104 by the computing device 102. In such an example, the cloud service 126 may collect contact information 110 from a plurality of contact information directories. In another example, the computing device 102 accesses the memory area 108 to obtain and display the contact information 110 to the user 104. The contact information 110 is associated with one or more of the contacts.

In some embodiments, the contact panel 304 is defined to be a portion of the user interface 107. In other embodiments, the contact panel 304 substantially occupies or consumes the user interface 107. For example, the contact panel 304 or other defined portion of the user interface 107 represents a contact card or address book card or entry for a particular contact.

The computing device 102 displays, in the contact panel 304, one or more of the contact information elements 112 associated with the contact information 110 for the contact. The computing device 102 further displays at 204 presence information 116 and/or a conversation history 117 associated with the contact. For example, an activity status of the contact may be displayed along with a history of communication between the contact and the user 104 organized chronologically. In some embodiments, the conversation history 117 further includes a set of postings from the contact that are not specific to the user 104. For example, the postings may be directed to a set of users or the general public. The conversation history 117 may further identify the transport mode 114 associated with each communication item in the conversation history 117. For example, the conversation history 117 identifies whether a communication occurred via telephone (e.g., and include the telephone number), electronic mail (e.g., and include an electronic mail address), text message, instant message, or the like.

The computing device 102 defines the input field 306 or input panel within the contact panel 304 at 208. In some embodiments, the input field 306 is automatically displayed, and the transport mode or communication channel is automatically selected based on, for example, the presence status of the user 104, past interactions between the user 104 and the contact, sensors on the computing device 102, or a default setting. The input field 306 is designed to receive input from the user 104 directly into the contact panel 304. In some embodiments, the type, shape, size, and visual effect of the input field 306 in the contact panel 304 varies based on the transport mode 114 selected by the user 104 or by the computing device 102. In an example in which the user 104 communicates with the contact via electronic mail, the input field 306 may take the form of a popup window, bubble, panel, or other user interface element overlaying and/or displacing a portion of the displayed conversation history 117 (or other portion of the contact information 110 displayed in the contact panel 304). In an example in which the user 104 communicates with the contact via a text message, the input field 306 may displace some of the contact information 110 displayed in the contact panel 304. In an example in which the user 104 communicates with the contact via a video chat, the input field 306 may consume a plurality of portions of the contact panel 304 with a frame showing video of the contact and a frame showing video of the user 104.

Aspects of the disclosure contemplate the user 104 requesting to communicate with the contact in some embodiments. In such embodiments, the request may be received by the computing device 102 at 206. For example, the user 104 may select one of the items listed in the conversation history 117 by clicking, highlighting, or otherwise selecting the item. At least because each communication item has a transport mode 114 associated therewith, the selection of a communication item by the user 104 represents a request by the user 104 to communicate with the contact via a particular transport mode 114. In another example, the user 104 clicks or selects a designated user interface element to initiate communication with the contact (e.g., the user interface element may be labeled "communicate with contact"). In such an example, the user 104 selects a particular transport mode 114 (e.g., via a drop-down menu or popup list) after or while selecting the designated user interface element. The computing device 102 may present a set of the available transport modes 114 to the user 104 by identifying the transport modes 114 listed in the conversation history 117 for the contact.

In some embodiments, the user 104 selects the transport mode 114 based at least in part on the presence information 116 for the contact. For example, if the presence information 116 for the contact is "away," the user 104 may opt to send an electronic mail message to the contact. If the presence information 116 indicates that the contact is online and available, the user 104 may place a voice call or send an instant message.

In some embodiments, the user 104 may select a plurality of the transport modes 114 to communicate with the contact in multiple ways. For example, the user 104 requests to send a text message and an electronic mail message to the contact when the user 104 has an immediate request but also wants to provide additional information less suited for consumption via a text message. In such an example, the same message is sent to the contact via the two different transport modes 114.

If the request is received from the user 104 at 206, the computing device 102 defines the input field 306 or input panel within the contact panel 304 at 208 based on the received request.

At 210, the computing device 102 receives data from the user 104 via the input field 306 defined within the contact panel 304. The data is intended by the user 104 to be communicated to the contact. At 212, the computing device 102 sends the data received via the input field 306 to the contact using the selected transport mode 114.

The input field 306 is defined and presented to the user 104 within the context of the displayed contact panel 304. The user 104 is not directed to execute another application or otherwise navigate away from the contact panel 304 to communicate with the contact; rather, the user 104 inputs the data to be communicated to the contact into the contact panel 304 or a portion or extension thereof. Similarly, data received from the contact by the computing device 102 is provided by the computing device 102 for display in the contact panel 304.

One or more of the operations illustrated in FIG. 2 may be performed by an operating system and/or an address book application executing on the computing device 102. For example, the processor 106 may be programmed to execute the address book application to display the contact information 110, define or create the input field 306, receive the data from the user 104, and send the received data to the contact. Aspects of the disclosure enable the user 104 to interact with the address book application to communicate with the contact without being directed to execute an application separate from the address book application. For example, the user 104 does not leave the context of the address book application to execute a separate text message application, electronic mail program, video chat application, or the like.

In some embodiments, the computer-executable components illustrated in FIG. 1 execute to perform the operations illustrated in FIG. 2. For example, the contact panel component 118, when executed by the processor 106, causes the processor 106 to display the contact information 110 in the contact panel 304. The displayed contact information 110 includes the conversation history 117 and one or more of the transport modes 114 associated with items in the conversation history 117. The conversation history 117 describes a plurality of interactions between the user 104 and the contact via a plurality of the transport modes 114. In some embodiments, the contact panel component 118 displays the plurality of interactions sorted in chronological order.

The contact information 110 may be stored locally, or obtained from the cloud service 126 via the communications interface component 122.

The user interface component 120, when executed by the processor 106, causes the processor 106 to receive a request from the user 104 to communicate with the contact via at least one of the transport modes 114. The transport mode 114 is selected by the user 104 based at least in part on the conversation history 117 displayed in the contact panel 304 of the user interface 107.

In some embodiments, the user interface component 120 includes a graphics card for displaying data to the user 104 and receiving data from the user 104. The user interface component 120 may also include computer-executable instructions (e.g., a driver) for operating the graphics card. Further, the user interface component 120 may include a display (e.g., a touch screen display) and/or computer-executable instructions (e.g., a driver) for operating the display. The user interface component 120 may also include one or more of the following to provide data to the user 104 or receive data from the user 104: speakers, a sound card, a camera, a microphone, a vibration motor, one or more accelerometers, a BLUETOOTH brand communication module, global positioning system (GPS) hardware, and a photoreceptive light sensor. For example, the user 104 may input commands or manipulate data by moving the computing device 102 in a particular way. The user interface component 120 may also receive data from the user 104 via one or more external devices such as an external keyboard or from another computing device.

Based on the request received by the user interface component 120, the contact panel component 118 provides the input field 306 or panel within the displayed contact panel 304. The user interface component 120 receives, into the input panel, data from the user 104 for communication to the contact. The communications interface component 122, when executed by the processor 106, causes the processor 106 to send the data received into the input field 306 to the contact via the transport mode 114. In some embodiments, the communications interface component 122 includes a network interface card and/or computer-executable instructions (e.g., a driver) for operating the network interface card.

Figure 3:
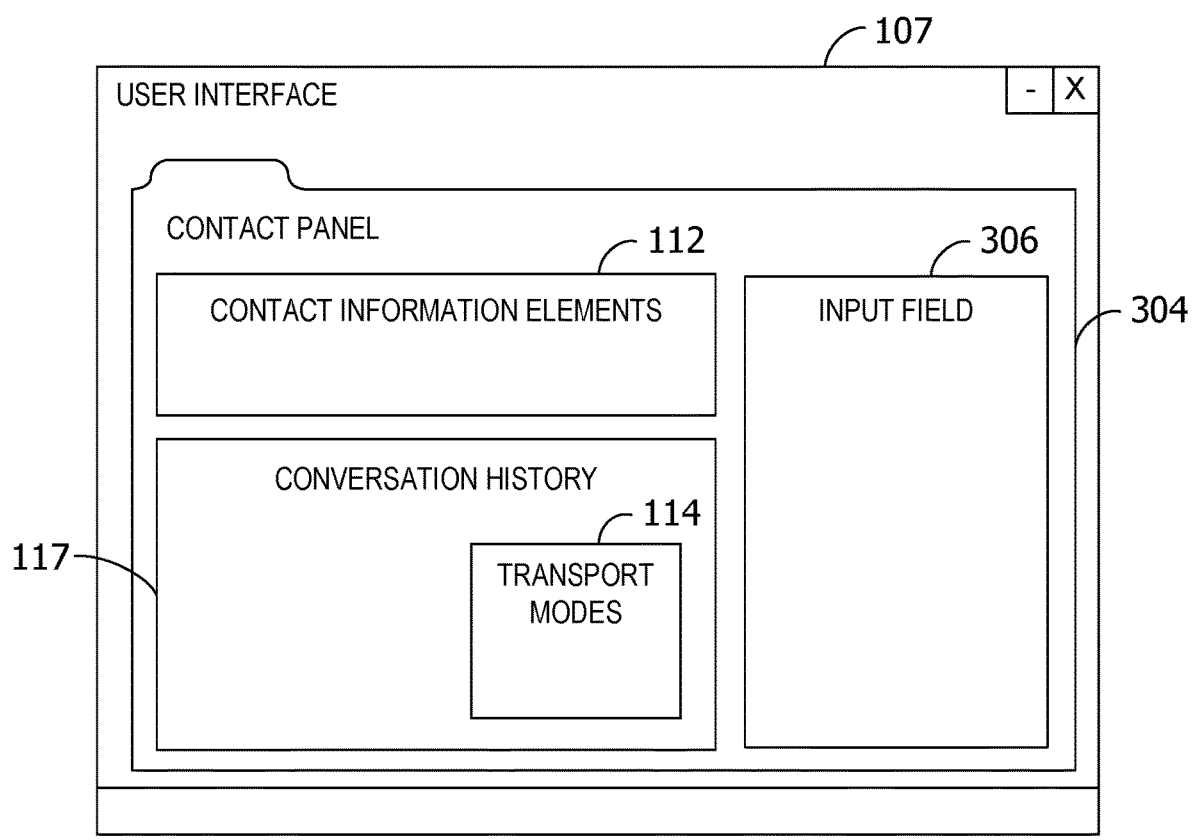
FIG. 3 is an exemplary diagram illustrating a contact panel displaying contact information elements, a conversation history, and an input field.

Referring next to FIG. 3, an exemplary diagram illustrates a contact panel 304 displaying contact information elements 112, the conversation history 117, and the input field 306. Upon selection of a contact by the user 104, the contact panel 304 is populated with contact information 110 associated with the selected contact. When the user 104 selects another contact, the contact panel 304 may be re-populated with contact information 110 associated with the newly selected contact. Alternatively, another tab may be created in the user interface 107 to contain another contact panel 304 for displaying the contact information 110 associated with the newly selected contact.

In the example of FIG. 3, the contact panel 304 is shown to consume a substantial portion of the user interface 107.

Aspects of the disclosure, however, contemplate that the contact panel 304 may consume any size portion of the user interface 107 or multiple portions. The contact panel 304 represents, for example, a contact card displaying contact information elements 112 associated with a particular contact. The contact panel 304 further displays the conversation history 117 including transport modes 114 associated with each of the communication items constituting the conversation history 117.

The contact panel 304 further displays the input field 306. The input field 306 may be displayed whenever the contact panel 304 is displayed, or may be displayed when a request to communicate with the contact is received from the user 104.

While the conversation history 117 is displayed within the contact panel 304 in FIG. 3, the conversation history 117 may be shown adjacent to, or otherwise near, the contact panel 304 in other embodiments (not shown).

Further, in some embodiments, the input field 306 is positioned within the conversation history 117 such that communication with the contact seamlessly becomes part of the history built between the user 104 and the contact.

Figure 4:
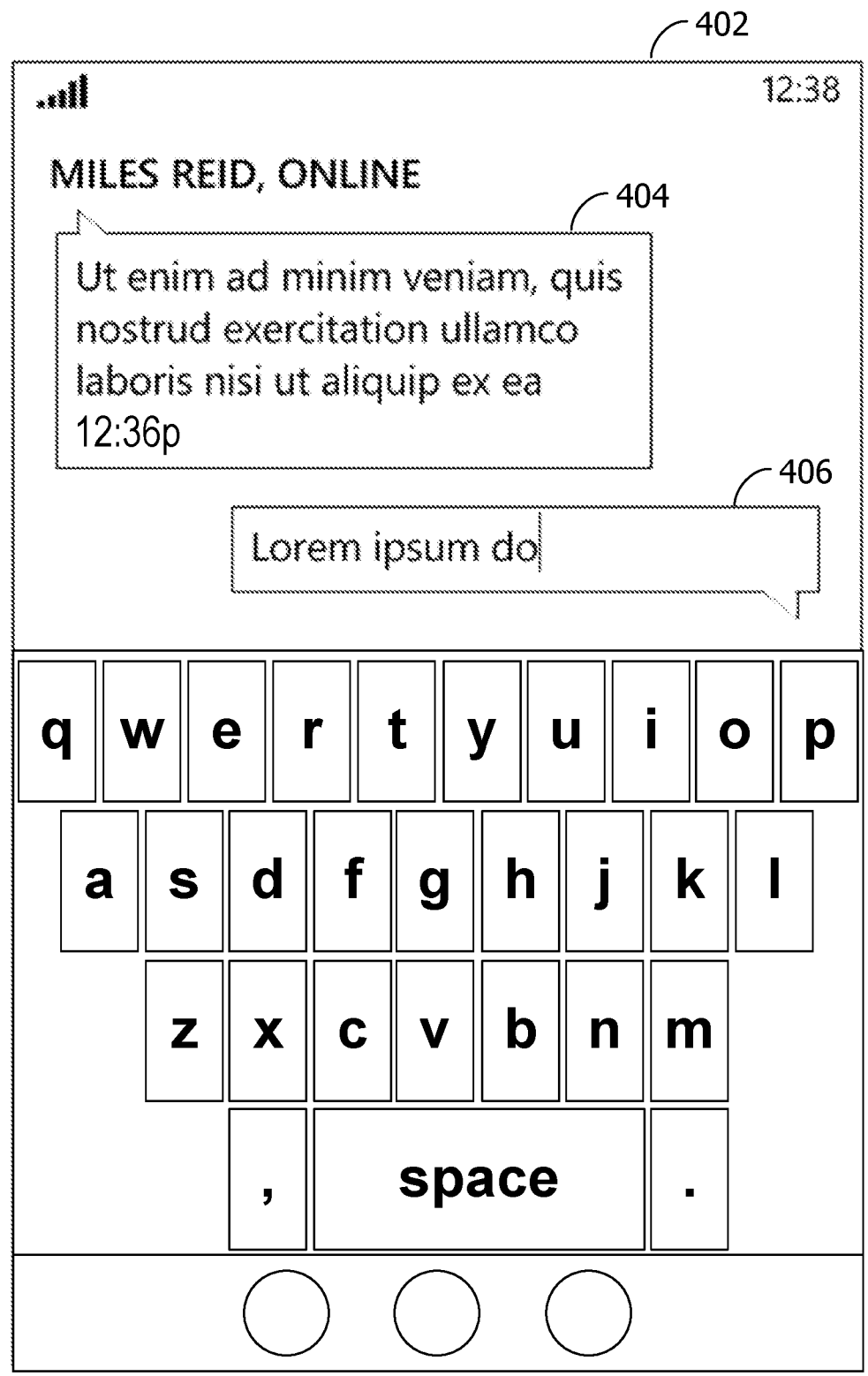
FIG. 4 is an exemplary user interface illustrating an input field for communicating with a contact.

Referring next to FIG. 4, an exemplary user interface 402 illustrates an input field 406 for communicating with a contact. In the example of FIG. 4, a portion 404 of the conversation history 117 between the user 104 and a contact, Miles Reid, is displayed in the user interface 402. In addition, presence information 116 (e.g., "online") associated with the contact is displayed. The user 104 has opted to communicate with the contact, and the input field 406 appears within the context of the conversation history 117. The user 104 begins entering data into the input field 406 for transmission to the contact. The entered data is subsequently sent to the contact.

Referring next to FIG. 5A through FIG. 5D, exemplary user interfaces illustrate portions of a scrollable conversation history. The communication items displayed as part of the conversation history are organized, in this example, in chronological order starting with the oldest item first. In the examples of FIG. 5A through FIG. 5D, the conversation history includes the communication items received from the user 104 via input fields and sent to the contact. Aspects of the disclosure contemplate, however, that the conversation history may include content from any interface or any other device used to communicate with the contact.

An exemplary conversation history such as in FIG. 5A through FIG. 5D illustrates how communication by the user 104 with a particular contact may seamlessly flow from one transport mode 114 or communication channel to another without interrupting the conversation. In an example (not shown), a conversation begun via instant messaging (e.g., while the contact was sitting at a computer) continues via text messaging when the contact transitions to using a mobile telephone but is sitting on a crowded bus. The conversation may conclude with a telephone call after the contact exits the bus. Each of the communication items described in this scenario are stored and displayed as part of the conversation history.

Figure 5A:
FIG. 5A through FIG. 5D are exemplary user interfaces illustrating a scrollable conversation history.

In FIG. 5A, a user interface 502 displays a portion of the conversation history including telephone items, email items and social networking items (e.g., items posted or sent using one or more social networking websites). The user 104 opted to communicate with the contact, Miles Reid, via a social networking account, and an input field (not shown) appeared within the context of the displayed conversation history. The user 104 entered data into the input field for transmission to the contact via the social networking account. The conversation history indicates that the entered data was subsequently sent to the contact (e.g., based on the time stamp associated therewith) as shown in frame 504.

Figure 5B:
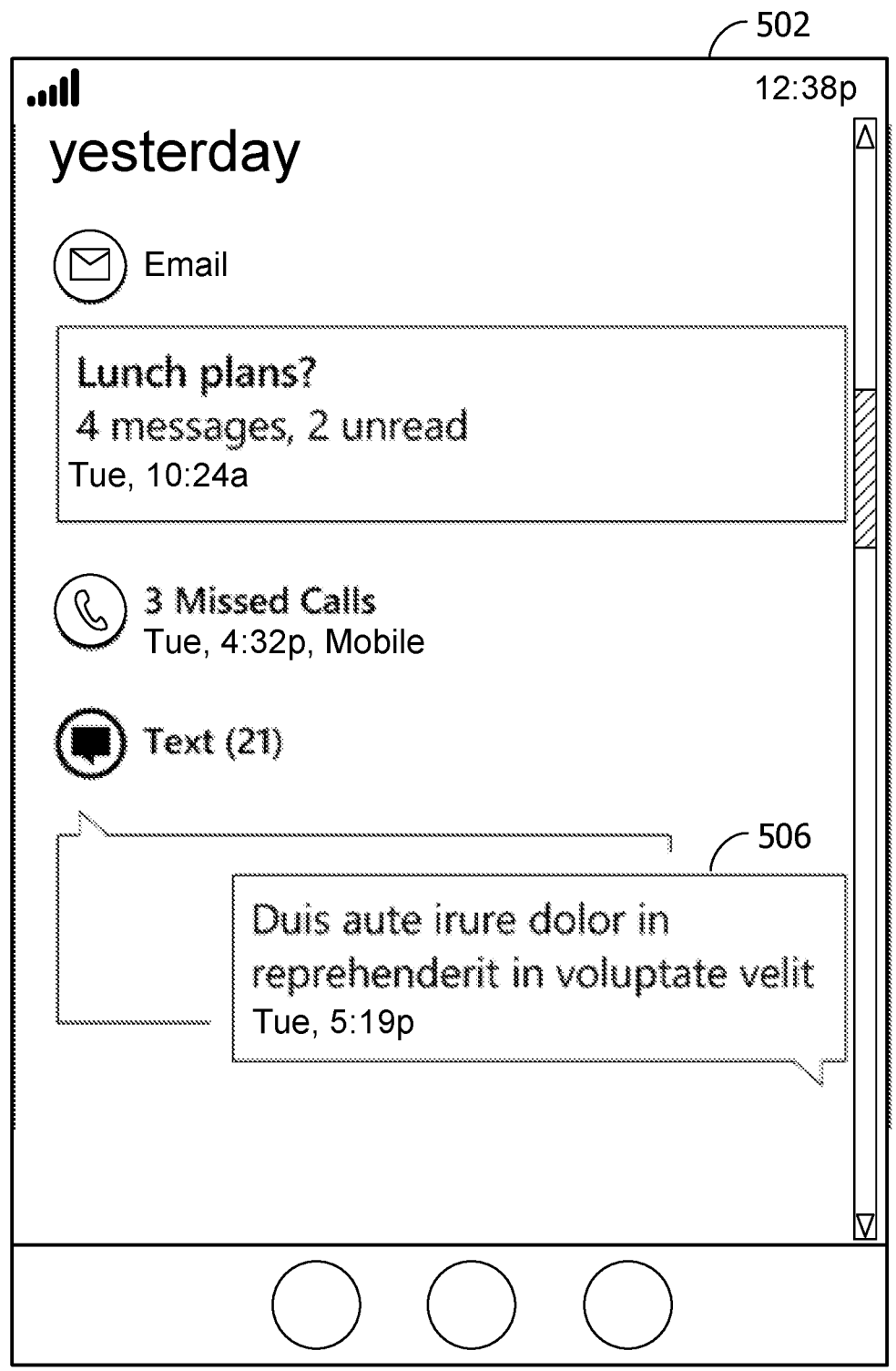

In FIG. 5B, the user interface 502 displays a portion of the conversation history including email items, telephone items, and text messaging items. The user 104 opted to communicate with the contact via text messaging, and an input field (not shown) appeared within the context of the displayed conversation history. The user 104 entered data into the input field for transmission to the contact via text messaging. The conversation history indicates that the entered data was subsequently sent to the contact (e.g., based on the time stamp associated therewith) as shown in frame 506.

Figure 5C:
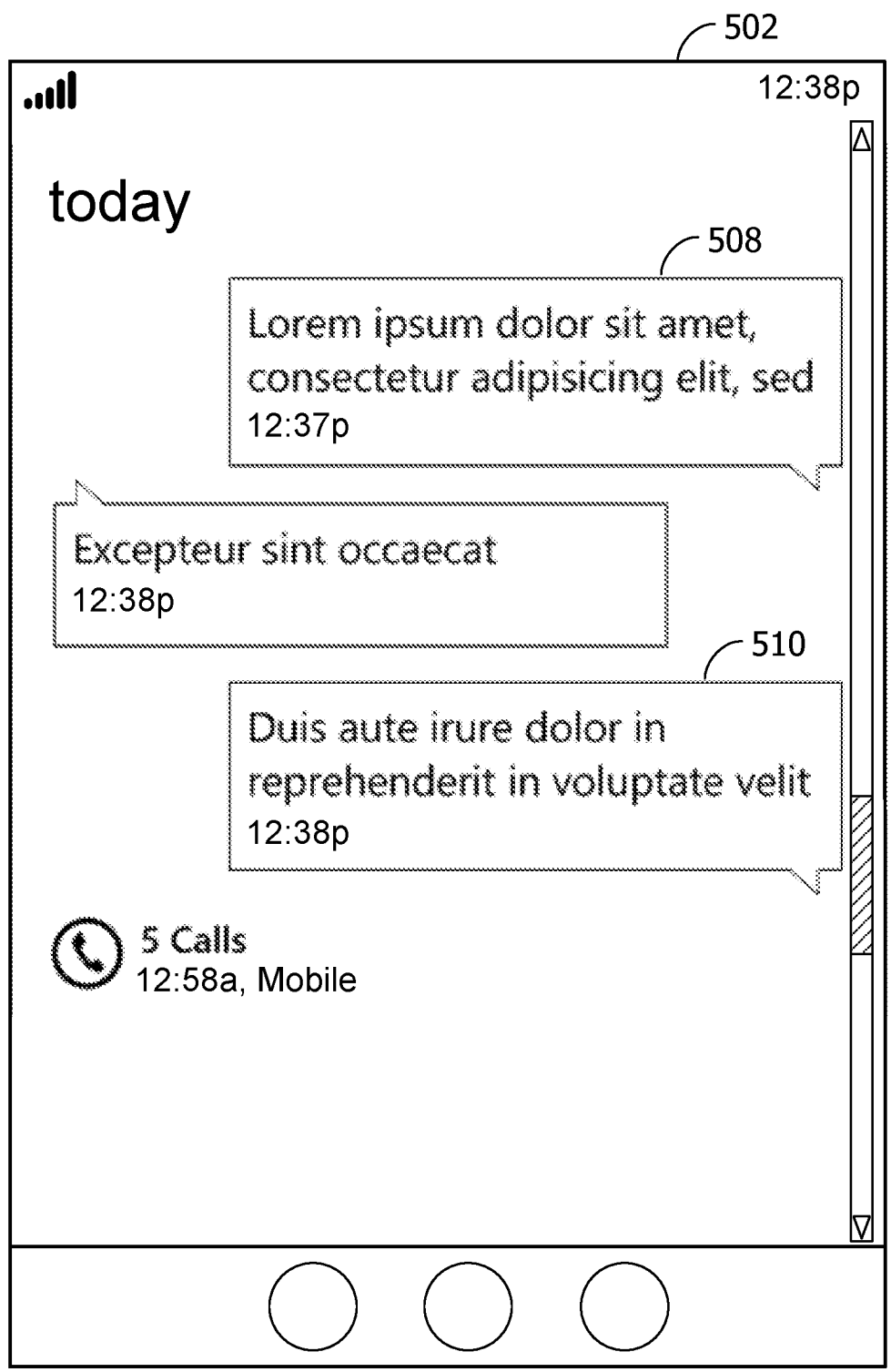

In FIG. 5C, the user interface 502 displays a portion of the conversation history including text messaging items and telephone items. The user 104 opted to communicate with the contact via text messaging, and input fields (not shown) appeared within the context of the displayed conversation history. The user 104 entered data into the input fields for transmission to the contact via text messaging. The conversation history indicates that the entered data was subsequently sent to the contact (e.g., based on the timestamps associated therewith) as shown in frames 508, 510.

Figure 5D:
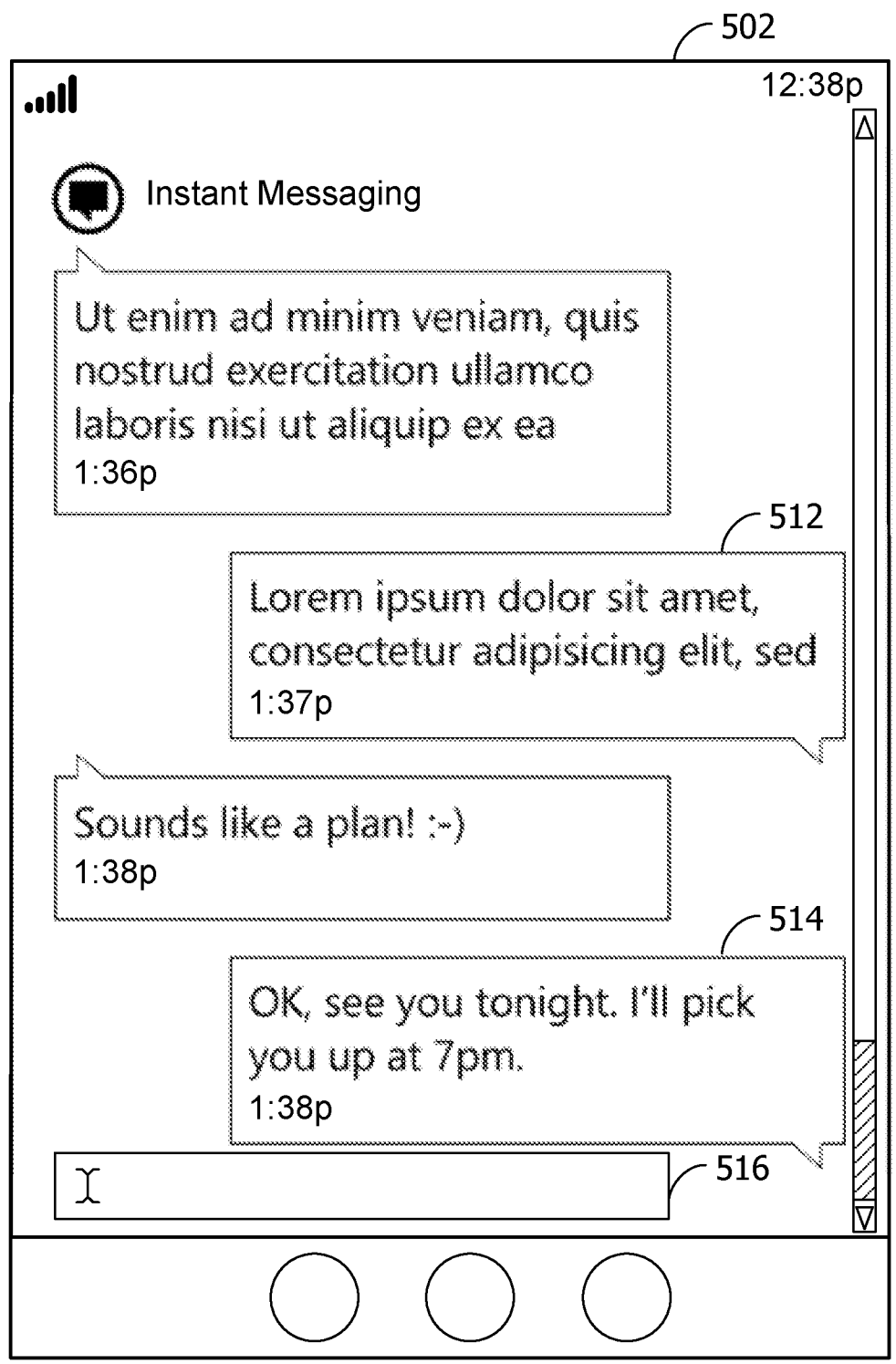

In FIG. 5D, the user interface 502 displays a portion of the conversation history including instant messaging items. The user 104 opted to communicate with the contact via instant messaging. For example, the user 104 may have noticed that the presence information 116 in FIG. 5A indicates that the contact is online. Input fields (not shown) appeared within the context of the displayed conversation history. The user 104 entered data into the input fields for transmission to the contact via instant messaging. The conversation history indicates that the entered data was subsequently sent to the contact (e.g., based on the timestamps associated therewith) as shown in frames 512 and 514.

The user 104 may interact with the conversation history illustrated in FIG. 5A through FIG. 5D. For example, the user 104 may collapse portions of the conversation history into sessions, time periods, subjects, transport modes 114 (e.g., specific communication channels), or other criteria. Collapsing portions of the conversation history enables the user 104 to find and consume particular communication items. Further, in some embodiments, the user 104 is able to search the conversation history via text queries, voice queries, or other search means. Similarly, the user 104 may filter the conversation history to hide particular communication items (e.g., by contact name, if the conversation involves multiple contacts) or group communication items within the conversation history.

The user 104 may also sort or otherwise organize the conversation history based on criteria other than time stamps. For example, the user 104 may group the communication items by transport mode 114.

FIG. 5D also shows an input field 516 within the conversation history available for input by the user 104.

Additional Examples

In some embodiments, a portion of the conversation history 117 may be displayed external to the contact panel 304. For example, some of the communication items in the conversation history 117 may be copied to a home screen or desktop of the user's mobile computing device. In other examples, notifications may be surfaced in a tile, toast, popup, or other user interface element. Notifications may also be displayed within the contact list or provided to other computing devices or accessory devices associated the mobile computing device. In some embodiments, the notifications identify the contact involved in the notification and provide details of the contact such as information from a social networking website. The notifications or other communication items provide proactive notification of updates to the conversation history 117.

The notifications may be prioritized for display to the user 104. For example, communication notifications (e.g., relating to missed calls, emails, text messages, instant messages, and the like) may take precedence over social update notifications (e.g., relating to photographs, stories, status messages, and the like from social networking web sites). The prioritizing affects which notifications are displayed to the user 104 in the tiles, popups, or other locations on the computing device 102.

Alternatively or in addition, multiple notifications may be consolidated into a single item on a shared tile or other user interface element based on a category or group associated with the notifications. For example, "5 new items" from contacts in a "family" group may be displayed on a tile, rather than a list of each of the five new items. Aspects of the disclosure contemplate operations to intelligently select which notifications to display on which tiles (e.g., shared tiles). For example, the operations execute to decide which items to promote based on a set of contacts frequently contacted by the user 104, a set of favorite contacts, and/or contacts associated with a particular group. In another example, adaptive heuristic operations analyze relationship data such as employer/employee and/or manager/report, relationship data identified from social networking web sites, or previous user behavior to decide which notifications to surface in a shared context. Exemplary user behavior includes tracking which emails are viewed first by the user 104, time spent viewing each email, which emails are saved, which transports are preferred, and the like.

Aspects of the disclosure may further notify the user 104 using non-visual means including sound and touch (e.g., vibration). For example, one or more contacts may be assigned a particular ringtone or vibration pattern to alert the user 104 of a received communication item involving the contact.

The input field 306 may be provided in numerous locations in the contact panel 304. In some embodiments, the input field 306 is available for display near the latest communication item displayed in the conversation history 117. In other embodiments, the input field 306 is available for display near the latest communication item for each particular type (e.g., the most recent electronic mail message, the most recent text message, etc.). For example, the input field 306 may be inline with the latest communication item. In still other embodiments, the input field 306 is available for display near any of the communication items displayed in the conversation history 117.

In embodiments in which the conversation history 117 includes communication items relating to VoIP calls, aspects of the disclosure contemplate the computing device 102 or the cloud service 126 receiving the communication items from a third-party application providing the VoIP functionality. For example, a third-party VoIP application installed on the computing device 102 publishes the call histories between users 104 and contacts to the computing device 102 (e.g., the operating system or an address book application) and/or the cloud service 126. The computing device 102 (or the cloud service 126) then incorporates the published call histories into the conversation history 117 for the corresponding users 104 and contacts.

At least a portion of the functionality of the various elements in FIG. 1 may be performed by other elements in FIG. 1, or an entity (e.g., processor, web service, server, application program, computing device, etc.) not shown in FIG. 1.

In some embodiments, the operations illustrated in FIG. 2 may be implemented as software instructions encoded on a computer-readable medium, in hardware programmed or designed to perform the operations, or both. For example, aspects of the disclosure may be implemented as a system on a chip.

While no personally identifiable information is tracked by aspects of the disclosure, embodiments have been described with reference to data monitored and/or collected from users 104. In such embodiments, notice is provided to the users 104 of the collection of the data (e.g., via a dialog box or preference setting) and users 104 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media store information such as computer readable instructions, data structures, program modules or other data. Computer readable storage media exclude propagated data signals. Communication media typically embody computer readable instructions, data structures, program modules, or other data in a modulated data signal such as a carrier wave or other transport mechanism and include any information delivery media.

Although described in connection with an exemplary computing system environment, embodiments of the invention are operational with numerous other general purpose or special purpose computing system environments or configurations. Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for providing integrated reply functionality within the portion of the user interface 107 displaying the contact information elements 112, and exemplary means for providing the input field 306 within the portion of the user interface 107 displaying the contact information elements 112 to enable the user 104 to initiate communication with the contact from therewithin.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for integrated messaging within a user interface, said system comprising:
a memory area associated with a mobile computing device, said memory area storing contact information elements associated with a contact, said contact information elements identifying a plurality of transport modes for communication with the contact, a first contact information element of the contact information elements enabling communication between the mobile computing device and the contact using a first transport mode of the plurality of transport modes, a second contact information element of the contact information elements enabling communication between the mobile computing device and the contact using a second transport mode of the plurality of transport modes, the first transport mode using a first protocol to transfer communication and the second transport mode using a second protocol to transfer communication, the first protocol being different than the second protocol; and
a processor programmed to:
access presence information for the contact with respect to the first contact information element and the second contact information element, the presence information providing an availability of the contact to communicate using the first transport mode or the second transport mode;
select the second transport mode based at least in part on past interactions with the contact and the presence information;
receive data from a user to communicate to the contact using the second transport mode; and
send the received data to the contact via the second transport mode.

2. The system of claim 1, wherein the processor is programmed further to create an input field based on the second transport mode selected by the user.

3. The system of claim 1, wherein the processor is further programmed to execute an address book application to:
display the contact information elements; and
create at least one of a first input field and a second input field corresponding to the first contact information element and the second contact information element, respectively.

4. The system of claim 3, wherein the processor is further programmed to:
send the received data to the contact without executing an application separate from the address book application.

5. The system of claim 3, wherein the processor is further programmed to integrate a reply functionality within a portion of the user interface displaying the contact information elements.

6. The system of claim 3, wherein the processor is further programmed to provide the first input field within the user interface displaying the contact information elements to enable the user to initiate communication with the contact from therewithin.

7. A method comprising:
receiving contact information associated with a contact, the contact information associated with a plurality of transport modes;
based on the contact information, providing, within a user interface of a computing device, a first input field to display communication between the computing device and the contact using a first transport mode of the plurality of transport modes, the first transport mode using a first protocol to transfer communication between the computing device and the contact;
based on the contact information, providing, within the user interface, a second input field to display communication between the computing device and the contact using a second transport mode of the plurality of transport modes, the second transport mode using a second protocol to transfer communication between the computing device and the contact, the second protocol being different than the first protocol;
access presence information for the contact with respect to the first input field and the second input field, the presence information providing an availability of the contact to communicate using the first transport mode or the second transport mode;
select the second transport mode based at least in part on the presence information past interactions with the contact and;
receive data from a user to communicate to the contact using the second transport mode; and
send the received data to the contact via the second transport mode.

8. The method of claim 7, wherein receiving the contact information comprises receiving contact information collected from a plurality of contact information directories.

9. The method of claim 7, further comprising selecting the first transport mode based on one or more of the following:

a presence status of the contact, previous interactions with the contact, and sensors in the computing device.

10. The method of claim 7, further comprising displaying the contact information in one or more of the following user interface elements: a frame, a panel, a bubble, and a popup.

11. The method of claim 7, further comprising:
receiving data into the first input field; and
sending the data to the contact using the first transport mode.

12. The method of claim 7, further comprising:
receiving data from the contact via the first transport mode; and
replying to the contact using the second transport mode.

13. The method of claim 7, further comprising displaying the contact information in the user interface, wherein the contact information displayed in the user interface represents an address book card for the contact, and wherein data is sent to the contact within a context of the address book card for the contact.

14. The method of claim 7, further comprising providing a conversation history for display in the user interface of the computing device, the conversation history corresponding to a set of previous communications with the contact.

15. The method of claim 14, wherein the computing device comprises a mobile computing device, the method further comprising displaying one or more communications from the set of previous communications on a home screen of the mobile computing device.

16. One or more computer-readable storage media embodying computer-executable components, said components comprising:
a contact panel component that upon execution causes at least one processor to display contact information in a contact panel of a user interface of a computing device, said contact information being associated with a contact, said contact information including a first transport mode and a second transport mode, the first transport mode using a first protocol and the second transport mode using a second protocol that is different than the first protocol; and
a user interface component that upon execution causes at least one processor to:
access communication and first presence information associated with the first transport mode in a first input panel in the user interface;
access communication and second presence information associated with the second transport mode in a second input panel in the user interface, the first presence information providing an availability of the contact to communicate using the first transport mode and second presence information providing an availability of the contact to communicate using the second transport mode; and
select the second transport mode based at least in part on the presence information and past interactions with the contact.

17. The one or more computer-readable storage media of claim 16, wherein the user interface component further causes at least one processor to display, in the user interface, a conversation history associated with the contact, the conversation history comprising a plurality of interactions with the contact using the first transport mode and the second transport mode.

18. The one or more computer-readable storage media of claim 17, wherein the contact panel component displays the plurality of interactions sorted in chronological order.

19. The one or more computer-readable storage media of claim 16, wherein the first input panel and the second input panel are displayed simultaneously in the user interface.

20. The one or more computer-readable storage media of claim 16, further comprising a communications interface component that upon execution causes at least one processor to send data received into the second input panel to the contact by the second transport mode.

* * * * *